US007072801B2

(12) United States Patent
James

(10) Patent No.: US 7,072,801 B2
(45) Date of Patent: Jul. 4, 2006

(54) REMOTE GENERATOR FUEL MONITORING SYSTEM

(75) Inventor: C. Pat James, Huntersville, NC (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 0 days.

(21) Appl. No.: 10/735,124

(22) Filed: Dec. 12, 2003

(65) Prior Publication Data

US 2005/0143958 A1   Jun. 30, 2005

(51) Int. Cl.
G06F 11/00 (2006.01)
G06F 15/00 (2006.01)
(52) U.S. Cl. ..................................................... 702/188
(58) Field of Classification Search ................ 702/188, 702/189, 127, 108, 116
See application file for complete search history.

(56) References Cited

U.S. PATENT DOCUMENTS

| | | | |
|---|---|---|---|
| 4,977,529 A | | 12/1990 | Gregg et al. |
| 5,332,927 A | * | 7/1994 | Paul et al. ..................... 307/66 |
| 6,067,030 A | * | 5/2000 | Burnett et al. ......... 340/870.05 |
| 6,441,505 B1 | * | 8/2002 | Poletti et al. ............... 290/1 A |
| 6,591,296 B1 | | 7/2003 | Ghanime |
| 6,839,597 B1 | | 1/2005 | Hattori et al. |
| 6,853,959 B1 | | 2/2005 | Ikeda et al. |
| 2002/0134083 A1 | * | 9/2002 | Staphanos et al. ............. 60/698 |
| 2003/0014219 A1 | | 1/2003 | Shimizu et al. |
| 2003/0098683 A1 | | 5/2003 | Lapimki et al. |
| 2004/0102872 A1 | | 5/2004 | Schick et al. |
| 2004/0107415 A1 | | 6/2004 | Melamed et al. |
| 2005/0071093 A1 | | 3/2005 | Stefan |

OTHER PUBLICATIONS

Applicant's statement regarding client-server based software application in Information Disclosure Statement.
Applicant's statement regarding dialup-connection for retrieving backup generator data in Information Disclosure statement.
Patent Application entitled "Remote DC Plant Monitoring System"; filed Dec. 12, 2003; U.S. Appl. No. 10/735,479.
Patent Application entitled "Web-Based Generator Testing and Monitoring System"; filed Dec. 12, 2003; U.S. Appl. No. 10/735,130.
Applicant's statement regarding where the client-server based software application was in existence by at least the date Nov. 12, 2002.
Application's statement regarding where the dialup-connection software application was in existence by at least the date Nov. 12, 2002.

* cited by examiner

*Primary Examiner*—Bryan Bui
*Assistant Examiner*—Demetrius Pretlow
(74) *Attorney, Agent, or Firm*—Thomas, Kayden, Horstemeyer & Risley LLP

(57) ABSTRACT

A remote generator fuel monitoring system is provided. The system can include graphical user interface logic and connection logic. The graphical user interface logic typically provides a user with periodically updated data points associated with a fuel monitor coupled to an AC plant. The connection logic typically connects to a monitoring server and receives the periodically updated data points associated with the fuel monitor, the monitoring server being coupled to a number of fuel monitors via a network. Methods and other systems are also provided.

34 Claims, 12 Drawing Sheets

FIG. 10

| I/O CONFIGURATION (DC SIGNALS) | ○ AC SGNL ● DC SGNL | ADD AC | ADD DC | ADD FUEL | DEL AC | DEL DC | EQ. ID | 5 | |
|---|---|---|---|---|---|---|---|---|---|
| | CHANNEL | MIN VAL | MAX VAL | MIN ALARM | MAX ALARM | VISIBLE | CHAN | | |
| DC DISCHARGE CURRENT | A02 | 0 | 800 | 540 | 600 | X | N/A | | |
| DC TOTAL CHG CURRENT | F02 | 0 | 800 | 540 | 600 | X | N/A | | |
| DC PLANT VOLT. | A01 | -55 | -45 | -50 | -50 | X | FALS | | |
| 48 VOLT MINOR | B02 | 0 | 0 | 0 | 0 | X | FALS | | |
| DC MINOR | B04 | 0 | 0 | 0 | 0 | X | FALS | | |
| LOW VOLT BATT. | B05 | 0 | 0 | 0 | 0 | X | FALS | | |
| 48 VOLT MAJOR | B01 | 0 | 0 | 0 | 0 | X | FALS | | |
| VERY LOW VOLT. | B06 | 0 | 0 | 0 | 0 | X | FALS | | |
| DIST FUSE MAJ. | B03 | 0 | 0 | 0 | 0 | X | FALS | | |
| HIGH VOLTAGE | B07 | 0 | 0 | 0 | 0 | X | FALS | | |
| RECTIFIER 1 | A03 | 0 | 230 | 0 | 220 | X | N/A | | |
| RECTIFIER 2 | A04 | 0 | 230 | 0 | 220 | X | N/A | | |
| RECTIFIER 3 | A05 | 0 | 230 | 0 | 220 | X | N/A | | |

WLMGNCLE-1231H/DGU

SAVE | CANCEL | CLOSE

FIG. 12

REMOTE GENERATOR FUEL MONITORING SYSTEM

TECHNICAL FIELD

The present disclosure relates generally to backup power generation, and more particularly to testing and monitoring backup power generators.

DESCRIPTION OF THE RELATED ART

Increasing dependence is being placed upon telecommunications networks. As a result, there is a significant amount of overhead dedicated to ensuring that the telecommunications network is rarely in a state of failure. One such area of overhead is dedicated to ensuring that upon a power outage at a central office (CO), generators at the CO automatically start and compensate for the power failure. These generators are typically quite large and very expensive, and provide power to not only the central office, but to each of the customer premises (CP) lines connected to the central office.

In order to ensure that each of these generators located at the central offices are functional in the event of a commercial power failure, a maintenance technician has historically been used to travel to each of the central offices in a region to test the generators and assure that each of the generators in that region are working properly. In order to assure that the generators are working properly, the technician has typically started each of the generators. Upon starting the generator, the maintenance technician would monitor the system for a period of time. The maintenance technician would typically monitor each of the gauges and determine whether the generator was in proper shape to handle a power outage.

However, work force reduction has resulted in a technician being responsible for an increasing number of central offices over a larger region. Moreover, such increased responsibility and travel demands for the job can result in a high turnover rate for technicians. Therefore, there is a need for systems and methods that address these and/or other perceived shortcomings.

SUMMARY OF THE DISCLOSURE

One embodiment, among others, of the present disclosure provides for a remote generator fuel monitoring system. A representative system, among others, includes graphical user interface logic and connection logic. The graphical user interface logic typically provides a user with periodically updated data points associated with a fuel monitor coupled to an AC plant. The connection logic typically connects to a monitoring server and receives the periodically updated data points associated with the fuel monitor, the monitoring server being coupled to a number of fuel monitors via a network.

Another embodiment of a remote generator fuel monitoring system includes monitoring logic, storage logic and communication logic. The monitoring logic monitors a fuel monitor associated with an AC plant, and receives data signals associated with the fuel monitor. The storage logic stores boundary parameters associated with the fuel monitor. The communication logic receives the data signals and boundary parameters, and provides the data signals and the boundary parameters to a remote computer.

Other embodiments of the present disclosure provide methods and computer readable medium programs for remotely monitoring a fuel monitor. A representative method, among others, can include the following steps: requesting a plurality of data signals associated with the fuel monitor coupled to an AC plant; receiving the plurality of data signals associated with the fuel monitor; and, providing the plurality of data signals associated with the fuel monitor to a remote computer for display to a user.

Other systems, methods, and/or computer programs products according to embodiments will be or become apparent to one with skill in the art upon review of the following drawings and detailed description. It is intended that all such additional system, methods, and/or computer program products be included within this description, and be within the scope of the present disclosure.

BRIEF DESCRIPTION OF THE FIGURES

The disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 10 is a sample screen shot of an embodiment, among others, of an office configuration screen representation of the generator testing and monitoring application of FIG. 3.

FIG. 12 is a sample screen shot of an embodiment, among others, of a DC I/O configuration screen representation of the generator testing and monitoring application of FIG. 3.

DETAILED DESCRIPTION

Embodiments of the disclosure now will be described more fully with reference to the accompanying drawings. The disclosure may, however, be embodied in many different forms and should not be construed as limited to the embodiments set forth herein; rather, these embodiments are intended to convey the scope of the disclosure to those skilled in the art. Furthermore, all "examples" given herein are intended to be non-limiting.

Figure 1:
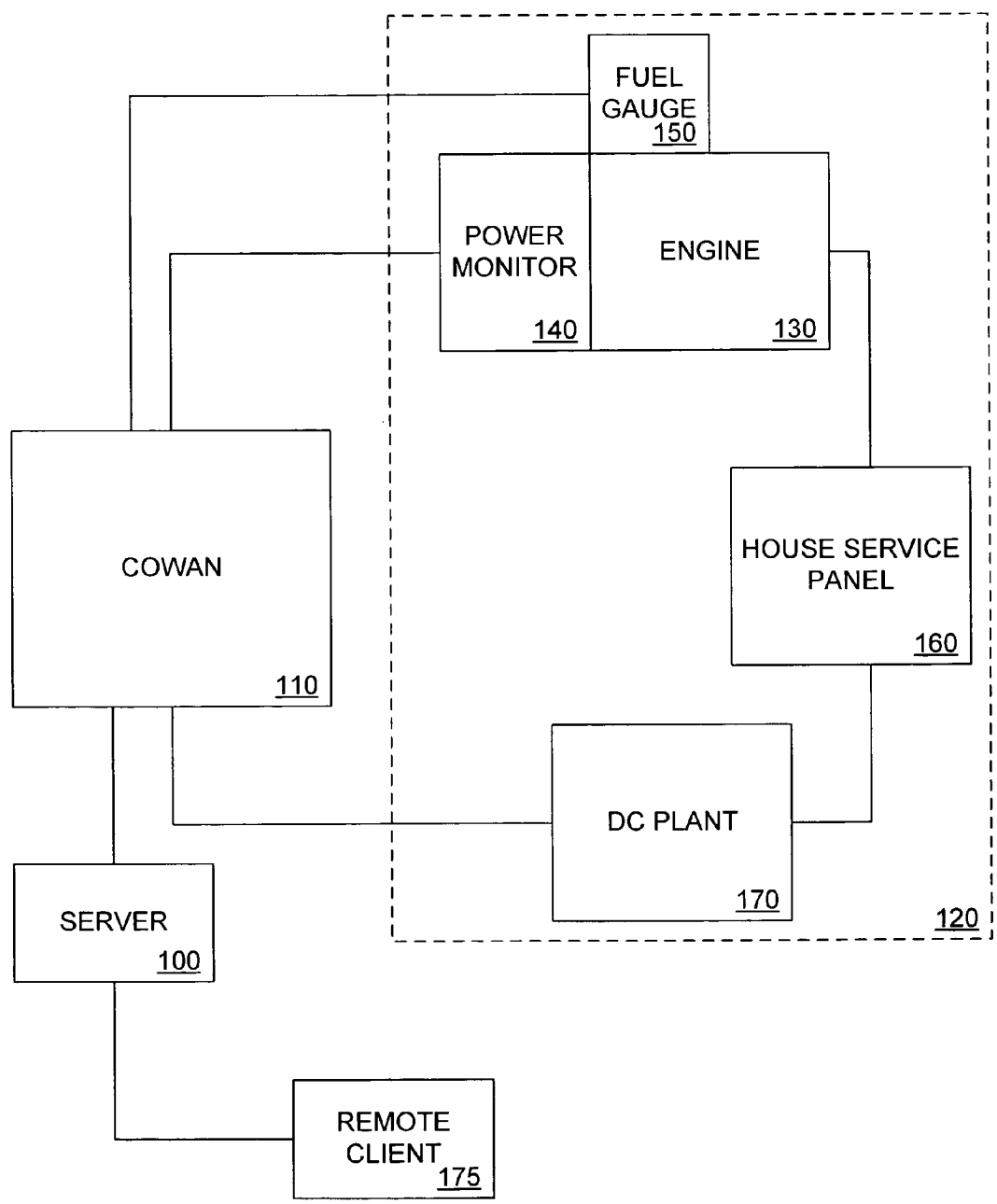
FIG. 1 is a block diagram of an embodiment, among others, of a testing and monitoring system of the present disclosure.

Referring now to FIG. 1, shown is a block diagram of an embodiment, among others, of a generator testing and monitoring system. The system typically includes a server 100 which is connected to a wide area network (WAN) 110. In an embodiment, among others, of the present disclosure, the WAN 110 is a central office wide area network (COWAN). The wide area network 110 connects points, such as such as telecommunications equipment (not shown), within a central office (CO) 120, and connects COs 120. Moreover, in an embodiment, among others, of the present disclosure, the WAN 110 provides for secured access, as will be understood by those skilled in the art.

The server 100 is typically connected to central office 120 via WAN 110. The CO 120 typically includes a backup power generator (engine) 130. The backup power generator 130 typically uses a diesel engine to generate alternating current (AC) power upon any power failure at the CO 120. The backup power generator 130 typically includes a power monitor 140 and a fuel gauge 150. The power monitor 140 monitors the power output of the backup power generator 130. The fuel gauge 150 typically monitors the fuel that remains in the diesel engine fuel storage tank. A suitable fuel gauge is available from Incon, Inc. of Saco, ME. Each of the power monitor 140 and the fuel gauge 150 also generate alarms that indicate a problem with the backup generator. Additionally, one skilled in the art should understand that in alternative embodiments, there are other monitors or gauges that measure parameters associated with the backup power generator 130.

AC power (typically from the power utility company) typically enters the CO 120 through the house service panel (HSP) 160. The HSP 160 typically senses the AC power failure and instructs the backup power generator 130 to startup. The AC power generator 130 is then ready to supply AC power to the CO 120. The CO 120 typically also has a number of systems that operate on direct current (DC) (e.g., the power supplied to telecommunication equipment is often DC). As such, the CO 120 also typically includes a DC plant 170, which is operable to store energy and supply DC power to telecom equipment and a customer premises (not shown). Examples, among others, of suitable DC plants are the Vortex® rectifier module from Marconi—Outside Plant, Power and Services (OPPS), of Lorain, Ohio, and the Galaxy® battery plant from Tyco International, Inc., of Portsmouth, N.H. The DC plant 170 typically uses the energy generated by the AC power generator 130 to recharge following the battery discharge condition by a loss of AC power and to maintain an alternative AC source during a power failure situation. This is typically done via the HSP 160 which recognizes when incoming power fails and switches the DC plant 170 from the incoming power to the backup power generator 130. The DC plant then receives the AC power via rectifiers which charge the DC plant by converting the AC power to DC power and storing the DC power. As one skilled in the art should understand, a DC plant 170 power level will gradually decay over time during a power failure situation. As such, in a situation where the power company is supplying full power, the DC plant 170 typically receives the incoming AC power through the HSP 160, and periodically charges itself.

As one skilled in the art should recognize, previously a power technician was required to travel to the CO 120 and use the HSP 160 to simulate a power failure. Regional Bell operating companies (RBOCs) typically had their power technicians run tests on the backup generators at least once every two weeks, for example. Previously this required travelling to the generator sites and manually starting the engines, and spend an hour monitoring the system.

The server 100 typically includes a generator testing and monitoring application (not shown) which is operable to simulate an AC power failure. To simulate a power failure on a system using a power monitor 140, the server sends a signal to the power monitor 140. The power monitor 140 then toggles an automatic transfer switch (ATS) test relay. The ATS test relay sends a signal to the remote start relay which operates a coil to generate a 30 second alarm to notify any on-site personnel that a remote start is being initiated. After the alarm sounds, the second stage of the power fail simulation opens the contact for commercial power, typically on phase 2 of the commercial power signal, causing the ATS in the HSP 160 to sense a power failure. The HSP 160 then senses the simulated AC power failure, and instructs the backup power generator 130 to start. The HSP 160 then receives the AC power from the backup power generator 130, and supplies the AC power signal to the DC plant 170. Moreover, the generator testing and monitoring system application is typically equipped to monitor the AC generator 130 and report any conditions that are outside of predefined parameters, as set up by a technician.

Figure 2:
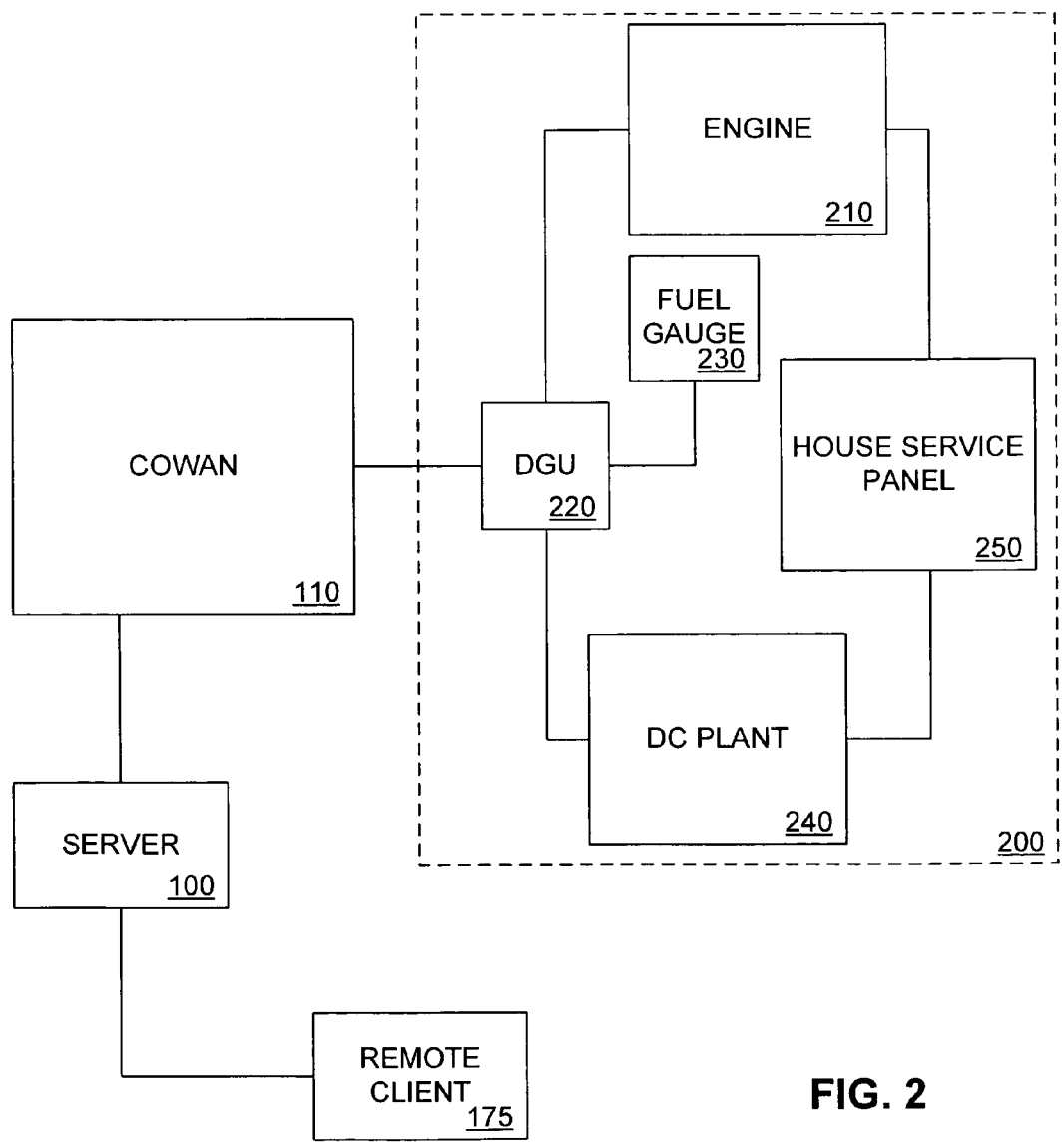
FIG. 2 is a block diagram of an alternative embodiment, among others, of a testing and monitoring system of the present disclosure.

Referring now to FIG. 2, shown is alternative embodiment of a backup power generation system. In this embodiment, among others, the CO 200 includes a backup power generator 210 that does not include a power monitor. Instead, a data gathering unit (DGU) 220, such as a Lorain® DGU, available from Marconi of Lorain, Ohio, collects information from the backup power generator 210. The DGU 220 is also coupled to the fuel gauge 230 associated with the backup power generator 210, and a DC plant 240.

Again the HSP 250 typically routes incoming power to the DC plant 240. Upon a power failure, the HSP 250 instructs the backup power generator 210 to startup. The HSP 250 also switches a relay to supply the DC plant 240 with AC power from the backup power generator 210. The DC plant 240 then continues to supply DC power to customer premises (and any other CO 200 equipment needing DC power) and recharges via rectifiers (not shown) coupled to the HSP 250.

A power failure simulation request received from a remote client 175 in the present embodiment, among others, causes a signal to be sent from the server 100 to the DGU 220. The DGU 220 then sounds the remote start alarm similarly to the embodiment of FIG. 1. After sounding the alarm, the DGU opens the contact with commercial power, typically on phase 2 of the three phase power signal. The open contact is sensed by an ATS at the HSP 250, which then operates similarly with respect to a normal power failure.

Figure 3:
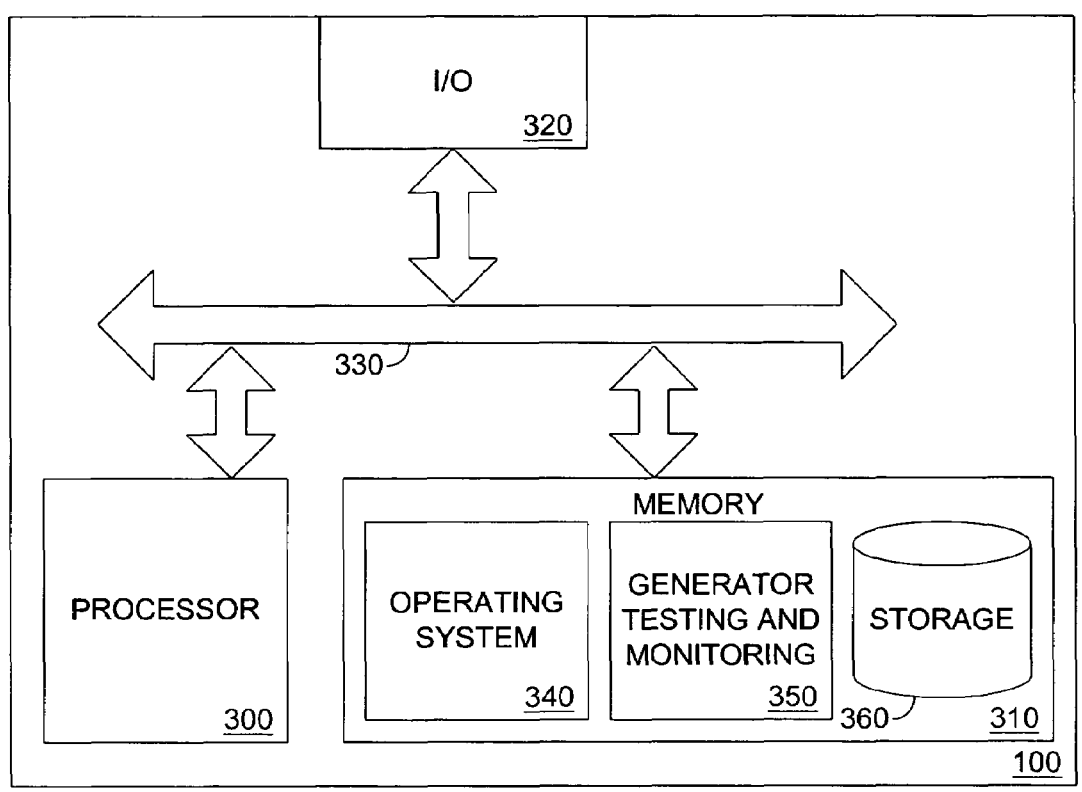
FIG. 3 is a generic block diagram of an embodiment, among others, of the server of FIGS. 1 and 2.

Referring now to FIG. 3, shown is a block diagram of an embodiment, among others, of the server 100 shown in FIGS. 1 and 2. Generally, in terms of hardware architecture, as shown in FIG. 3, the server 100 includes a processor 300, memory 310, and one or more input and/or output (I/O) devices 320 (or peripherals) that are communicatively coupled via a local interface 330. The local interface 330 can be, for example but not limited to, one or more buses or other wired or wireless connections, as is known in the art. The local interface 330 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 300 is a hardware device for executing software, particularly that stored in memory 310. The processor 300 can be any custom made or commercially available processor, a central processing unit (CPU), an auxiliary processor among several processors associated with the DSL modem 310, a semiconductor based microprocessor (in the form of a microchip or chip set), a macroprocessor, or generally any device for executing software instructions.

The memory 310 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 310 may incorporate electronic, magnetic, optical, and/or other types of storage media. Note that the memory 310 can have a distributed architecture, where various components are situated remote from one another, but can be accessed by the processor 310.

The software in memory 310 may include one or more separate programs 340, 350, each of which comprises an ordered listing of executable instructions for implementing logical functions. In the example of FIG. 3, the software in the memory 310 includes a generator testing and monitoring application 350 and a suitable operating system (O/S) 340. The operating system 340 essentially controls the execution of other computer programs, such as the generator testing and monitoring application 350, and provides scheduling, input-output control, memory management, and communication control and related services.

The generator testing and monitoring application 350 is a source program, executable program (object code), script, or any other entity comprising a set of instructions to be performed. When a source program, then the program needs to be translated via a compiler, assembler, interpreter, or the like, which may or may not be included within the memory 310, so as to operate properly in connection with the O/S 340. Furthermore, the generator testing and monitoring application 350 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 320 typically includes input devices, for example but not limited to, an ethernet connection jack for sending/receiving a data signal to/from a CO 120, 200. The I/O devices 320 may further include devices that communicate both inputs and outputs, for instance but not limited to, a radio frequency (RF) or other transceiver, a telephonic interface, a bridge, a router, etc.

When the server 100 is in operation, the processor 300 is configured to execute software stored within the memory 310, to communicate data to and from the memory 310, and to generally control operations of the server 100 pursuant to the software. The generator testing and monitoring application 350 and the O/S 340, in whole or in part, but typically the latter, are read by the processor 300, perhaps buffered within the processor 300, and then executed.

When the generator testing and monitoring application 350 is implemented in software, as is shown in FIG. 3, it should be noted that the generator testing and monitoring application 350 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The generator testing and monitoring application 350 may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The generator testing and monitoring application 350 shown operates to remotely test and monitor backup power generators. In particular, the generator testing and monitoring application 350 stored and executed on the server 100 could save many power technician hours by reducing the obligation to travel to any of a plurality of COs 120, 200 for which the power technician retains responsibility. Moreover, the generator testing and monitoring application stored and executed on the server 100 could help to eliminate failures that may occur between tests. For example, among others, if a DC plant 170, 240 develops a problem, the power technician can be notified almost immediately (barring substantial network delay), and the problem with the DC plant 170, 240 could be rectified. Similarly, if the backup AC power generator 130, 210 is low on fuel, the power technician could be notified almost immediately (barring substantial network delay), and the power technician could notify the CO 120, 200 that the backup generator 130, 210 is low on fuel, and the backup generator 130, 210 could be refilled.

Figure 4:
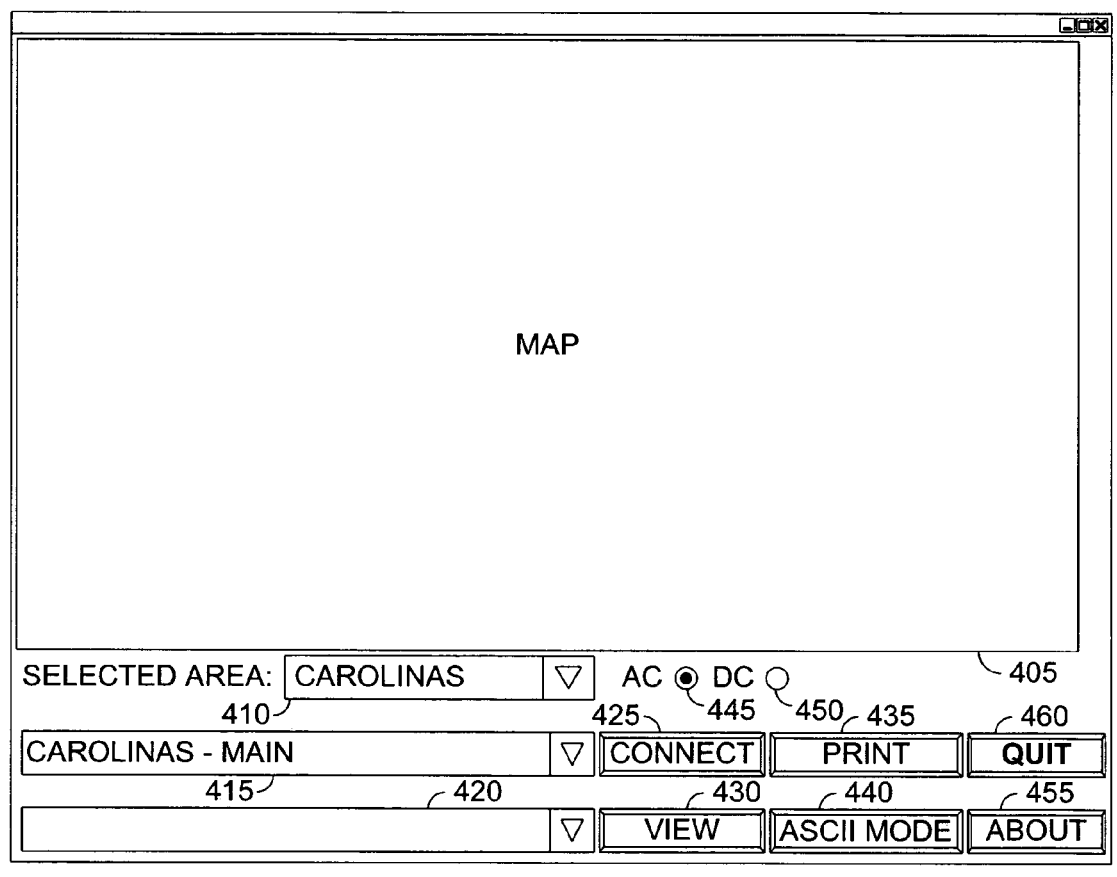
FIG. 4 is a sample screen shot of an embodiment, among others, of a main screen representation of the generator testing and monitoring application of FIG. 3.

Referring now to FIG. 4, shown is a sample screen shot of an embodiment, among others, of a main screen representation 400 of the generator testing and monitoring application 350 of FIG. 3. In an embodiment, among others, of the present disclosure, a user would typically select an icon on the client 175 to execute a client application which interfaces with the generator testing and monitoring application 350 on server 100. Alternatively, the server 100 is a web server, and the generator testing and monitoring application 350 comprises a dynamic web server application having a universal resource locator (URL) to which the user could point a web browser application on the client 175. It should be understood that in some embodiments, among others, the web server application is limited to transmission on an internal network (intranet). However, in alternative embodiments, among others, the web server could provide the information to an extranet, such as the internet. In yet a further alternative embodiment, among others, the generator testing and monitoring application could comprise both a remotely run client-server application and a web-server application. Typically the generator testing and monitoring application 350 is password protected, such that authorized users access the system by logging in upon opening a connection to the application 350 at server 100. However, as one skilled in the art should understand, there is no requirement that the application 350 be password protected in some embodiments.

Typically the main screen includes, among others: a map pane representation 405; selected area field representations 410–420; a "Connect" button representation 425; a "View" button representation 430; a "Print" button representation 435; an "ASCII Mode" button representation 440, an "AC" checkbox representation 445; a "DC" checkbox representation 450; an "About" button representation 455; and, a "Quit" button representation 460. The map pane representation 405 typically includes a map of the area currently selected. The map data is typically generated using a map program. One such map program, among many others, is a Map Point mapping program available from Microsoft, Corp. of Redmond, Wash. The selected area field representations 410–420 typically allow the user to select an area in which to view by using a pull-down menu, which, when used sequentially, pre-populates the pull-down menu with choices from a database of groups and subgroups, based upon the user's sequential selection(s). A service technician would typically use these fields 410–420 to view the area for which the server is responsible. The first field representation 410 typically represents a general area which the user has requested to view. The second field representation 415 typically represents a more detailed specification of the area which the user has requested to view. Typically the more detailed specification includes a server which typically serves a number of COs. The third field representation 420 typically represents a generator connected to the server selected in the second field representation 415. The "Connect" button representation 425 allows the user to connect to a currently selected CO 120, 200. Upon the user choosing to connect, the server 100 will typically establish a connection to the selected CO 120, 200 via the DGU 220, power monitor 140, or DC plant, and request updates from the equipment at a faster refresh rate. Prior to being connected, the "View" button representation 430, the "Print" button representation 435, and the "ASCII Mode" button representation 440 is typically "grayed-out" (not shown) such that these button representations 430–440 are not selectable by the user. However, upon connection these button representations 430–440 become selectable. The "View" button representation 430 when selected, sends a request to the server 100 for a detailed view of the currently connected CO 120, 200 equipment 140, 170, 220. The "Print" button representation 435 when selected enables the user to print the current screen with the connected generator details. The "ASCII Mode" button representation 440, when selected, enables the viewer to view a terminal representation of the details of the currently connected generator. The "AC" and "DC" checkbox representations 445, 450 allow the user to view the AC engines 130, 210 and DC plants 170, 240 separately. For example, when a user has selected the "AC" checkbox representation 445, such enables the user to view all of the AC engines 130, 210 in the currently selected area. Likewise, the "DC" checkbox representation 450, when selected, allows the user to monitor only the DC plants 170, 240 in the currently selected area. The "About" button representation 455 when selected, requests that the server 100 send details about the program and support information to the remote computer 175. The "Quit" button representation 460, when selected, closes the application and logs the user out of the server application 350.

Figure 5:
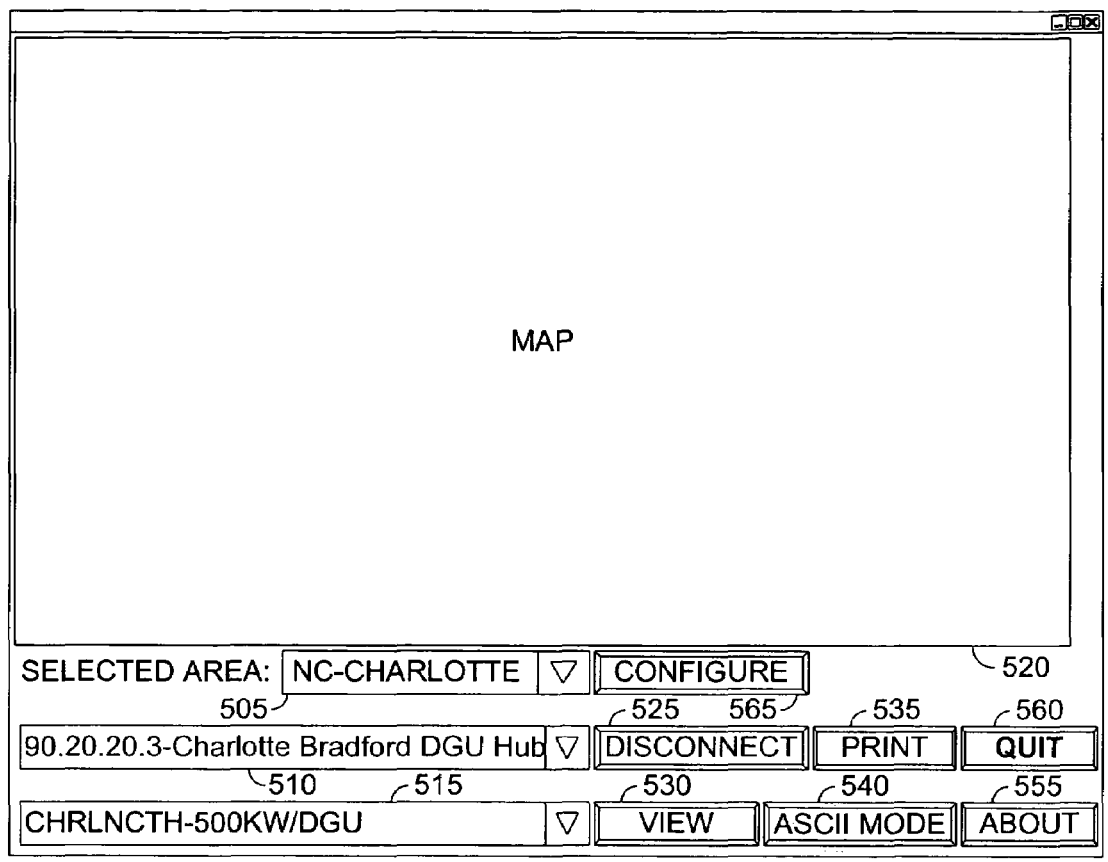
FIG. 5 is a sample screen shot of an embodiment, among others, of a connected screen representation of the generator testing and monitoring application of FIG. 3.

Referring now to FIG. 5, shown is a sample screen shot of an embodiment, among others, of a connected screen representation 500 of the generator testing and monitoring application 350 of FIG. 3. Typically, the connected screen representation 500 is reached after selecting a generator at the main screen representation 400 (FIG. 4) using the "Selected Area" field representations 410–420, and then selecting the "Connect" button representation 425. In FIG. 5, each of the "Selected Area" field representations 505–515 are filled. In this particular example, among many others, the selected area in the first field representation 505 is the "Carolinas," the selected area in the second field representation 510 is the "Charlotte-Bradford DGU Hub," and the selected area in the third field representation 515 is site specific generator unit(s) for that location. In this instance, the site specific generator is named "CHRLNCTH-500 KW/DGU".

The connected screen representation 500 is typically similar to the main screen representation 400 of FIG. 4. The most noticeable differences are that the map display 520 is a more detailed view of the selected area, the "Connect" button representation 425 (FIG. 4) is now the "Disconnect" button representation 525, and the "AC" and "DC" checkbox representations 445, 450 are no longer present. The "View" button representation 530, the "Print" button representation 535, and the "ASCII Mode" button representation 540 are now typically selectable by the user (the button representations 530–540 performing the tasks described above). The "About" button representation 555 and the "Quit" button representation 560 also perform the same operations described in reference to FIG. 4. The connected screen representation 500 also includes a "Configure" button representation 565. The "Configure" button representation 565 typically requests a configuration menu from the server 100. The configuration menu is typically utilized by the user to configure the settings of the generator to which the user is presently connected. These configuration menus will be discussed in more detail below.

Figure 6:
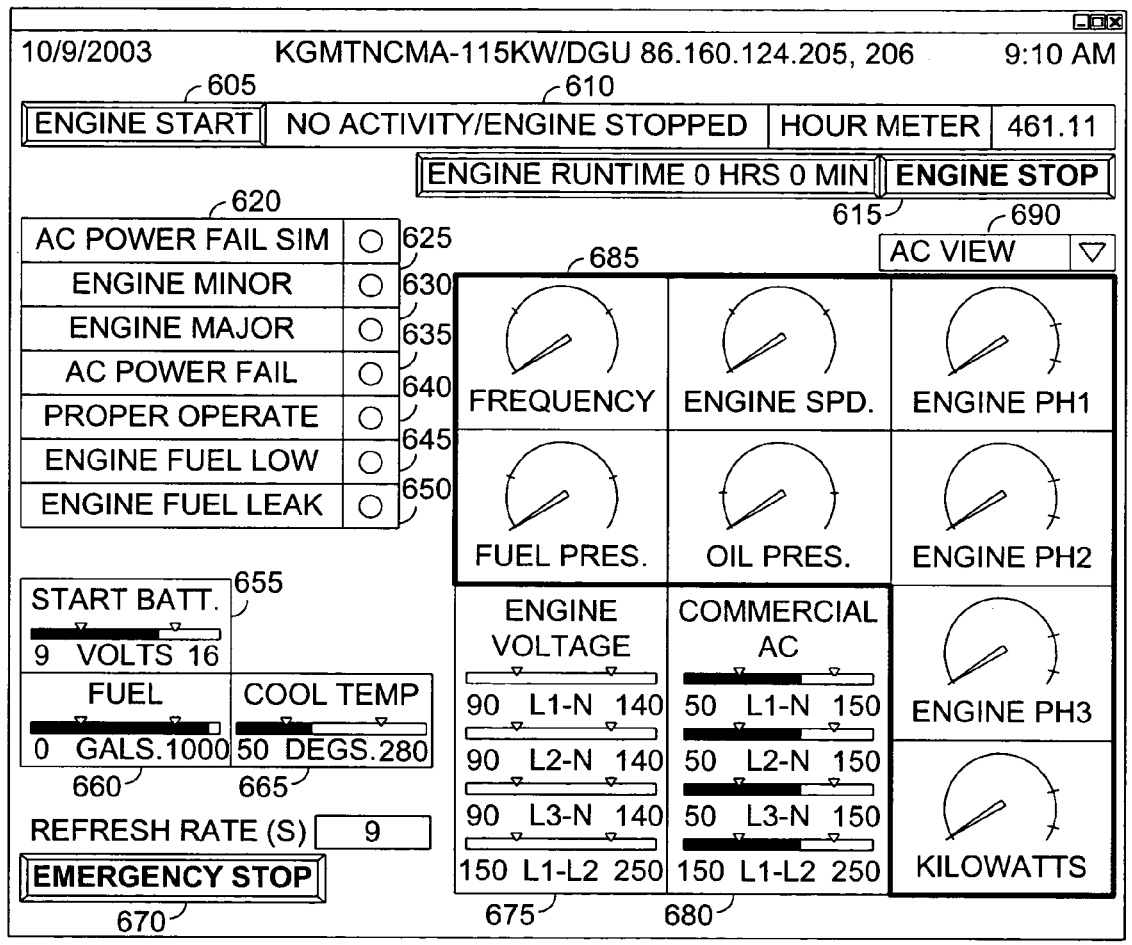
FIG. 6 is a sample screen shot of an embodiment, among others, of a view AC screen representation of the generator testing and monitoring application of FIG. 3.

Referring now to FIG. 6, shown is a sample screen shot of an embodiment, among others, of an engine detail screen representation 600. The engine detail screen representation 600 is typically accessed by selecting the "View" button representation 530 from the connected screen representation 500 of FIG. 5. The engine detail screen representation 600 typically includes, among others: an "Engine Start" button representation 605; a status field representation 610; and "Engine Stop" button representation 615; a number of discrete alarm indicators 620–650; a "Start Battery" gauge representation 655; a "Fuel" gauge representation 660; a "Cool Temp." gauge representation 665; an "Emergency Stop" button representation 670; "Engine Voltage" gauge representations 675; "Commercial AC" gauge representations 680; and output gauge representations 685.

The "Engine Start" button representation 605, when selected, typically instructs the generator testing and monitoring application 350 to simulate a power failure situation at the HSP 160, 250. A power technician could use this button representation to remotely test and monitor the generator 130, 210. Upon starting the generator 130, 210, the status field representation 610 would change to indicate the "Running" state of the generator 130, 210. In the present example, among others, the generator 130, 210 is not running, thus the status field representation 610 indicates a "No Activity" status.

The discrete alarm indicators 620–650 typically indicate alarm conditions at the generator 130, 210. Upon selecting the "Engine Start" button representation 605, the "AC Power Fail Simulate" alarm representation 620 would change status. Changing status involves changing the color of the lamp associated with the alarm representation to a color other than, for example, among others, green or black. This other color could be, for example, among others, the color red or yellow. The "Engine Minor" alarm representation 625 typically changes status upon any of the minor alarms being triggered. The minor alarms are typically set as preliminary high coolant temperature and/or a start battery rectifier failure, among others in other embodiments. The "Engine Major" alarm representation 630 typically changes status upon a major alarm being detected at the engine. Major alarms typically include every alarm situation which is not a minor alarm. The "AC Power Fail" alarm representation 635 typically indicates that a commercial AC power failure condition has been sensed by the engine control circuitry. The "Proper Operate" alarm representation 640 indicates that the engine is operating properly, and is nominally green, for example, among others. The "Engine Fuel Low" alarm representation 645 typically indicates that the engine fuel is low. As described in more detail below, the "Engine Fuel Low" alarm representation 645 typically has two states, a minor and a major, representing a non-critical and a critical status. The "Engine Fuel Leak" alarm representation 650 typically indicates that an alarm collector has detected a fuel leak.

The "Start Battery" gauge representation 655 typically presents a reading of the battery voltage at the generator 130, 210. The gauge representation 655 typically includes two "tick-marks" as set up by a user. The right-most tick-mark represents an over-voltage which causes a minor alarm, while the left-most tick represents an under-voltage which causes another minor alarm.

The "Fuel" gauge representation 660 typically presents the reading of the fuel left in the generator 130, 210 fuel tank. Again, the gauge representation 660 in some implementations, among others, includes two tick-marks. However, in this example, the right-most tick-mark represents a minor alarm, while the left-most tick-mark represents a major alarm. Typically this is done such that the power technician will receive a minor alarm notifying him or her that the fuel is low at the generator 130/210. When the major alarm triggers, the power technician understands that the fuel is dangerously low and needs to be addressed right away.

The "Cool Temp" gauge representation 665 represents the coolant temperature at the generator 130, 210. Again, the gauge representation 665 in some implementations includes two tick-marks. The left-most tick-mark represents a cold temperature at which the engine may have trouble starting right away. The right-most tick-mark represents an overheating temperature at which the generator 130, 210 may seize, similar to a car engine. As one skilled in the art might notice, there is a refresh rate field representation (not labeled) which alerts the user to the period between updates. It should be noted that each of the COWAN servers coupled to the application 350 in some embodiments, among others, periodically poll the coupled generators, even when no user is connected to a generator 130, 210. It should also be recognized that the refresh rate in one embodiment, is operable to be increased by the COWAN server selected, upon determining that a user is connected to a generator 130, 210.

The "Emergency Stop" button representation 670 typically provides a highlighted visual depiction that one of the engine shutdown alarms has been activated. Such emergency conditions include, among others, overheating of the engine, low/high fuel pressure, high RPMs, too much output, etc. Each of these conditions causes damage to the generator 130, 210, and would be a condition in which the engine control circuitry would typically shut down the engine.

The engine voltage gauge representations 675 typically represent the voltages that occur between three-phase output lines. As one skilled in the art should understand, three phase power is the typical transmission format of power lines to telecommunications central offices. The gauge representations therefore show the voltage level between each of the three phases and neutral, and between lines 1 and 2, resulting in the four readouts shown. Again, in some implementations, among others, each of the readouts include two tick-marks to represent the high and low voltages acceptable to the power technician. Similarly, the "Commercial AC" voltage gauge representations 680 represent the voltage being supplied through the commercial power lines (via the HSP 160, 250). The four voltage readouts represent the voltage differences between the three lines and neutral, and between lines one and two of the three-phase power signal. The readouts similarly have two tick-marks representing high and low acceptable voltages. When the voltage is between the tick-marks, the generator 130, 210 is performing normally. One skilled in the art should recognize that each of the tick-marks describe above are typically set by a power technician responsible for that generator 130, 210. However, it should also be recognized that the generator testing and monitoring application 350, in some embodiments, is preset with default or standardized levels based upon the equipment involved. Furthermore, it should be apparent to one skilled in the art that for different plant equipment, different numbers and tick marks are used that depend on the specific equipment involved.

The output gauge representations 685 typically include, among others: a frequency gauge; a fuel pressure gauge representation; an engine speed gauge representation; an oil pressure gauge representation; current monitors for each of the output lines; and, a power gauge representation. It should be recognized that each of the gauges, in some implementations, among others, have numbers (not shown) which are scaled appropriate to the measurement taken by the gauge. The frequency gauge representation typically represents the output frequency of the engine. In the North American system, the output frequency is nominally 60 Hz, which typically puts the tick marks at 59 and 61 Hz. The fuel pressure gauge representation monitors the fuel pressure of the generator 130, 210, and is typically between 15 and 35 PSI on a 115 kW generator. The engine speed gauge representation monitors the speed of the engine in terms of rotations per minute (RPM). The limits placed on RPM readings will typically vary from generator to generator, depending upon the model, type, expected output, etc., but can be between 1770 and 1830 RPM on a 115 kW generator. The oil pressure gauge representation typically represents the oil pressure in the engine, such as 35 and 65 PSI on a 115 kW generator. Each of the current monitor representations typically represent the output current on one of the three phase power lines, which is typically below 280 amps on a 115 kW generator. The power gauge representation represents the output power of the generator 130, 210, which is typically below 115 kW on a 115 kW generator.

Figure 7:
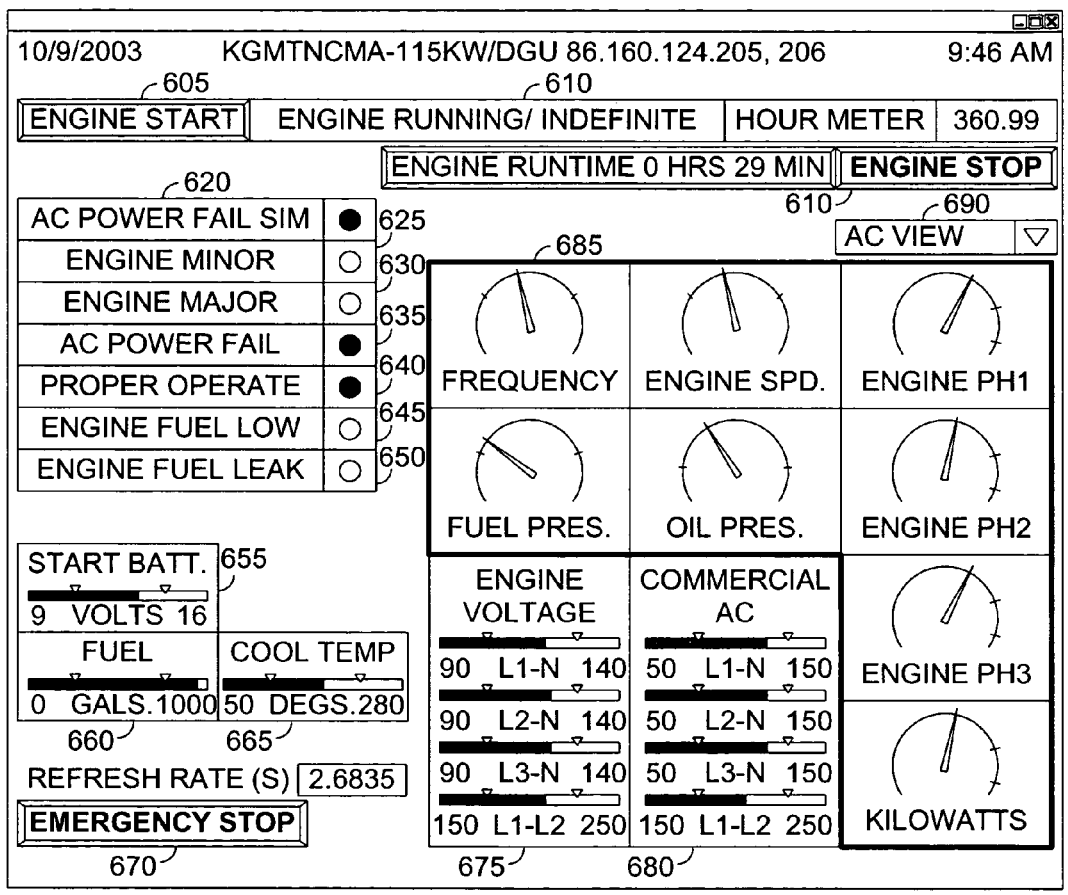
FIG. 7 is a sample screen shot of an embodiment, among others, of a power fail simulation screen representation of the generator testing and monitoring application of FIG. 3.

Referring now to FIG. 7, shown is a sample screen shot of an embodiment, among others, of a engine start screen representation 700. This screen representation 700 typically appears after the user has selected the "Engine Start" button representation 605 of the previous screen representation 600 (FIG. 6). One skilled in the art should note that the status field representation 610 has changed to indicate the running status of the engine. The "AC Power Fail Simulate" alarm representation 620 in some embodiments, among others, changes color to indicate the power fail simulation status. The "AC Power Fail" alarm representation 635 would change colors to simulate the failure of commercial power (one skilled in the art should note, however, that the "Commercial AC" gauge representation continues to read normal, such that the user would know that he or she could bring the system out of the power fail simulation). The "Proper Operate" alarm representation 640 would typically change colors to indicate the proper operation of the generator 130, 210. Typically, the "Cool Temp" gauge representation 665 may increase due to the running of the engine. The "Engine Voltage" gauge representations 675 would typically increase to between the tick-marks for each of the readouts, provided the system is operating normally. Similarly, the output gauge representations 685 would indicate the current output of the engine. In an embodiment, among others, of the present disclosure each of the output gauges are separated into color ranges which indicate normal operation of the generator 130, 210.

Figure 8:
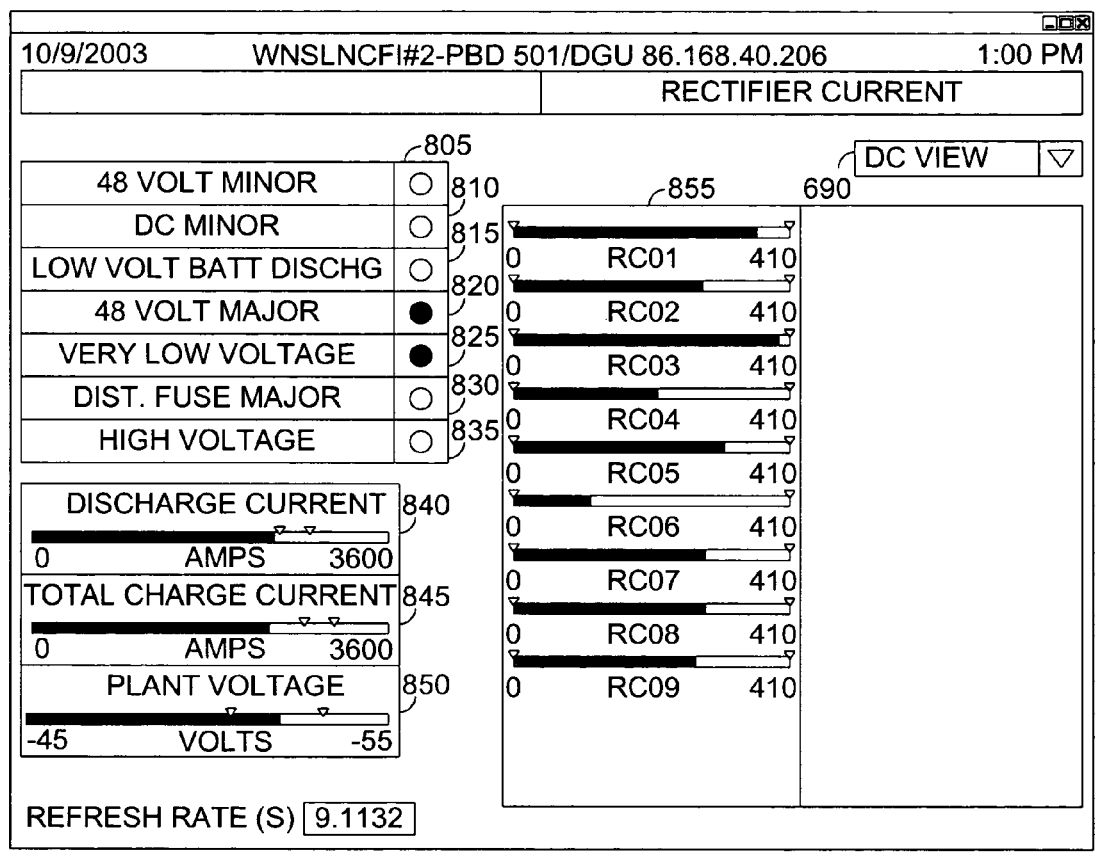
FIG. 8 is a sample screen shot of an embodiment, among others, of a view DC screen representation of the generator testing and monitoring application of FIG. 3.

Referring now to FIG. 8, shown is a sample screen shot of an embodiment, among others, of a DC plant view screen representation 800. The DC plant view screen representation 800 is typically reached by selecting a DC checkbox representation from the main screen representation 400, connecting to a DC plant and then choosing to view the DC plant. Alternatively, since each AC backup generator 130, 210 typically has a DC plant associated with it, when the AC generator 130, 210 and DC plant 170, 240 are being queried by a single DGU 220 (a single IP Address) the user would be able to select a "DC View" selection from a dropdown menu representation 690 (FIG. 6). However, when a DEC (available from Kohler Inc. of Kohler, Wis., as one example, among others) is coupled to the backup generator or power monitors 140 coupled to the backup generator, a user would typically return to the map to select the DC plant. The rectifiers at the DC plant are typically read through a solid state controller on newer DC plants and through a remote monitor device such as a DGU for other plants.

The DC plant view screen representation 800 typically includes a number of alarm representations 805–835. The alarm representations include, among others: a "48 Volt Minor" alarm representation 805; a "DC Minor" alarm representation 810; a "Low Volt Battery Discharge" alarm representation 815; a "48 Volt Major" alarm representation 820; a "Very Low Voltage" alarm representation 825; a "Distribution Fuse Major" alarm representation 830; and, a "High Voltage" alarm representation 835.

The "48 Volt Minor" alarm representation 805 typically indicates that one rectifier has been lost. The minor typically indicates that there are enough rectifiers remaining to carry the load that was originally carried by the rectifier that was lost. The "48 Volt Major" alarm representation 820 typically indicates that there are not enough rectifiers left to carry the load of the lost rectifier(s). The "DC Minor" alarm representation 810 typically indicates that a minor alarm is present at the DC plant. The "Low Volt Battery Discharge" alarm representation 815 typically indicates that the battery voltage is low. The "Very Low Voltage" alarm representation 825 would typically indicate that the battery is at a very low voltage (e.g. approaching the operating voltage for connected equipment). The "Distribution Fuse Major" alarm representation 830 typically indicates that a distribution fuse has operated and requires attention from a technician, since the equipment attached to that load no longer has DC power available. The "High Voltage" alarm representation 835 typically indicates that an over-voltage situation is present. In an over-voltage situation the battery is typically supplying too high a voltage to the connected equipment.

The DC plant view screen representation also typically includes a number of gauge representations 840–855. The gauge representations, in some implementations, include, among others: a "Discharge Current" gauge representation 840; a "Charge Current" gauge representation 845; a "Plant Voltage" gauge representation 850; and, rectifier current gauge representations 855. The "Discharge Current" gauge representation 840 typically indicates the current that is being discharged from the DC plant 170, 240. The "Charge Current" gauge representation 845 typically represents the charge current that is currently being input to the DC plant 170, 240 from the rectifiers. The "Plant Voltage" gauge representation 850 typically represents the output voltage of the DC plant 170, 240. The rectifier current gauge representations 855 typically indicate the current being supplied to the battery via the rectifiers at the DC plant 170, 240.

Figure 9:
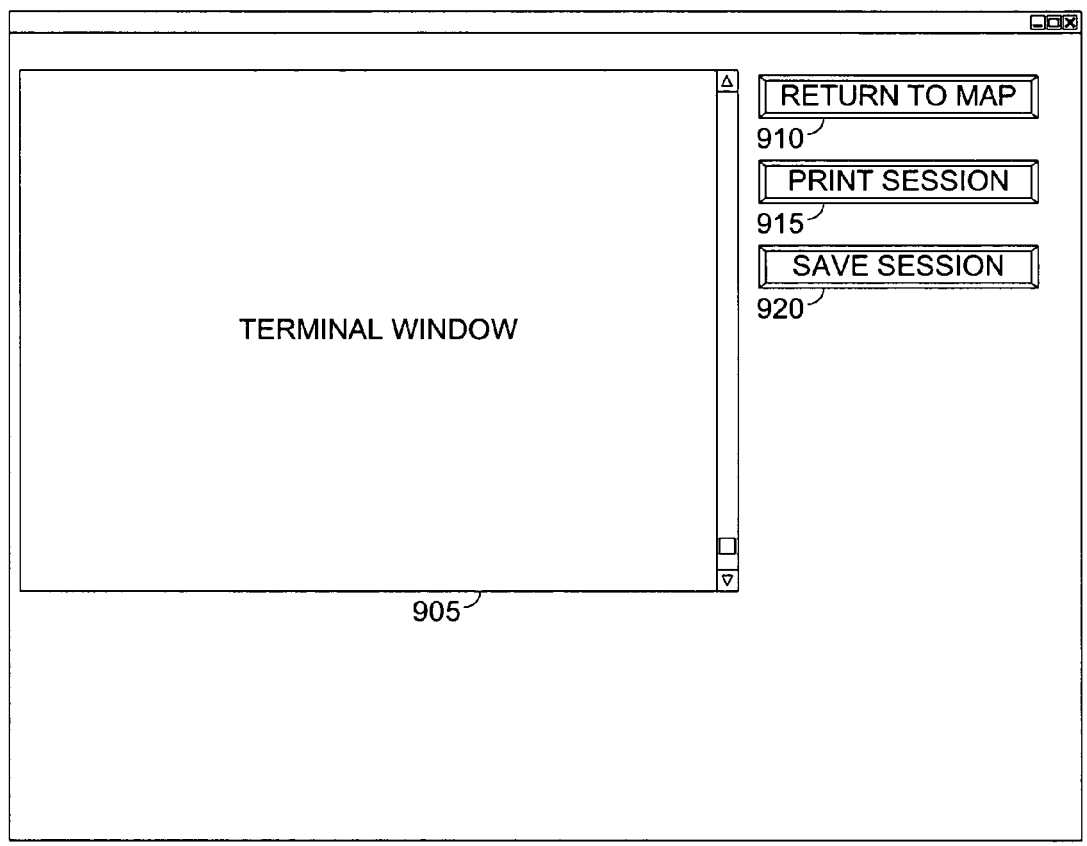
FIG. 9 is a sample screen shot of an embodiment, among others, of an ASCII mode screen representation of the generator testing and monitoring application of FIG. 3.

Referring now to FIG. 9, shown is a sample screen shot of an embodiment, among others, of an "ASCII Mode" terminal screen representation 900. The terminal 5 screen representation 905 typically provides a user with the ASCII output of the monitors at a central office location. Furthermore, the "ASCII Mode" terminal screen representation 900 typically provides a "Return to Map" button representation 910 to return to the connected screen representation 500 of FIG. 5. The "ASCII Mode" terminal screen representation 900 also provides a "Print Session" button representation 915, and a "Save Session" button representation 920. The "Print Session" button representation 915 enables a user to print the screen when selected, while the "Save Session" button representation 920, when selected, enables the user to save the current terminal session screen representation 900.

Figure 10:
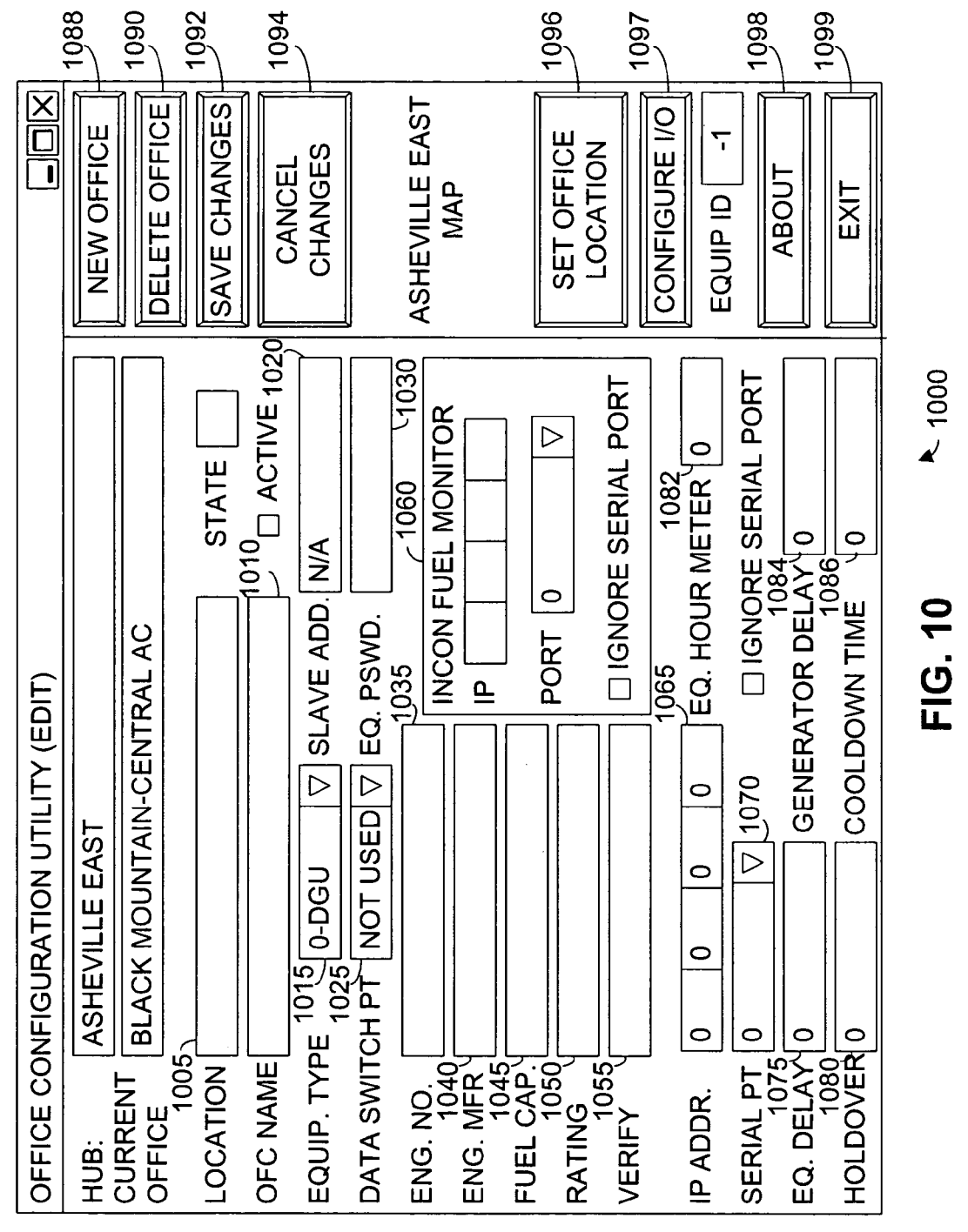

Referring now to FIG. 10, shown is a sample screen shot of an embodiment, among others, of an "Office Configuration" screen representation 1000. A user would typically use this screen to enter new office locations, or to change information regarding a current office. The user typically selects a hub and a current office, and adjust the settings that appear in the field representations below the hub and current office field representations. The "Location" field representation 1005 is used to provide the location of the current office, while the "Office Name" field representation 1010 is used to give a name to the current office. The "Equipment Type" pull-down menu representation 1015 typically includes, among others: a DGU equipment representation, either of the current DEC configurations, such as the 340 and 550 models, an Onan controller application, the Galaxy plant application and the PECO monitor configuration. The "Slave Address" field representation 1020 is used for entering connection configurations for the DEC controller/power monitor configurations. The "Data Switch Port" pull-down menu representation 1025 is used for entering the appropriate data switch port number in in the event that feature is being used on the Galaxy power plant. The "Equip. Password" field representation 1030 is used for entering a password for the selected equipment. The "Engine Number" field representation 1035 is used for entering the model number. The "Engine Manufacturer" field representation 1040 is used for entering the manufacturer of the generator. The "Fuel Tank Capacity" field representation 1045 is typically used for entering the capacity of the fuel tank used on the generator. The "Rating" field representation 1050 is typically used for entering a kilowatt rating of the engine/alternator. The "Verify" field representation 1055 is typically used for entering the date the configuration and readings were verified by the user. The "Incon Fuel Monitor" field representations 1060 are typically used for entering the internet protocol address and port of the fuel monitor. The equipment "IP Address" field representation 1065 is used for entering the IP address of the equipment specified. The "Serial Port" pull-down menu representation 1070 is typically used to select a serial port to which the server can connect. The "Equipment Delay" field representation 1075 is typically used to allow a delay before sending the start and stop signals to the equipment. The "Holdover Time" field representation 1080 is typically used to correspond with the office timer device that delays the transfer of AC power requirements back to commercial AC following the return of commercial power. The "Equip. Hour Meter" field representation 1082 is typically used to set up the office configuration to synchronize the engine actual run hour meter. The "Generator Delay" field representation 1084 is typically used to enter the amount of time that the engine delays the start procedure after sensing a commercial AC power failure indication. The "Cooldown Time" field representation 1086 is typically used to enter the amount of time it takes for the generator to cool down after being run.

The "Office Configuration" screen representation 1000 also typically includes a number of button representations. The "New Office" button representation 1088 enables the user to create a new office. The "Delete Office" button representation 1090 enables the user to delete the currently selected office. In some embodiments, among others, these functions are limited to supervisors. The "Save Changes" button representation 1092 enables the user to save the changes that he or she has made to the office configuration. The "Cancel Changes" button representation 1094 typically enables the user to clear any changes that he or she has made to the office configuration. The "Set Office Location" button representation 1096 typically enables the user to identify the proper location of the remote facility on the map for that geographical area. The "Configure I/O" button representation 1097 typically enables the user to configure the I/O ports of the equipment selected to be monitored. The configuration of the I/O will be discussed further with reference to FIG. 11. The "About" button representation 1098 typically enables the user to view details about the client and how to obtain help with the client. The "Exit" button representation 1099 typically enables the user to exit the configuration window.

Figure 11:
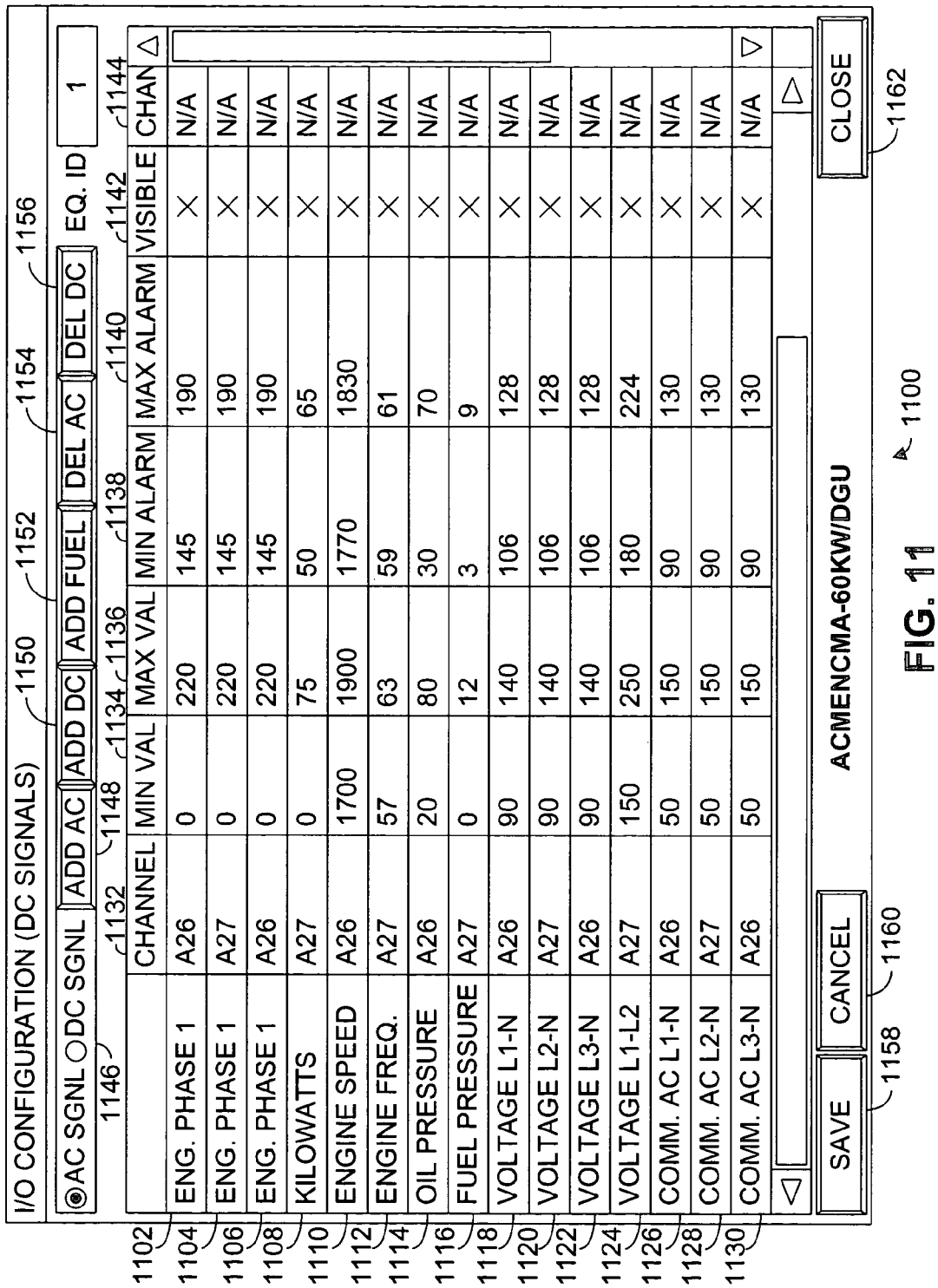
FIG. 11 is a sample screen shot of an embodiment, among others, of an AC I/O configuration screen representation of the generator testing and monitoring application of FIG. 3.

Referring now to FIG. 11, shown is a sample screen shot of an embodiment, among others, of an "I/O Configuration" screen representation 1100 for an AC generator (as selected by checkbox representation 1146). The "I/O Configuration" screen representation 1100 typically includes a number of row representations. Each of the row representations 1102–1130 typically refers to a variable monitored by the generator testing and monitoring application 350. Each of the column representations 1132–1144 after the variable represent different characteristics of the variable monitored. The "Channel" column representation 1132 typically represents the channel assigned to that variable to communicate with the remote device. The "Min Value," and "Max Value" column representations 1134, 1136, respectively, represent the limits of the gauges, as set by the user, while the "Min Alarm," and "Max Alarm" column representations 1138, 1140, respectively, represent the limits within which the signal stays without triggering an alarm. The "Visible" checkbox representation 1142 enables the user to make the variable visible or not visible to the user. The "Chan N/C" column representation 1144 typically represents the normal status of a monitored binary point, either a normally closed (N/C) condition or a normally open (N/O) condition.

The user can switch to a similar DC plant I/O configuration screen representation upon selecting the "DC signals" checkbox representation 1146. The DC signals at the DC plant I/O configuration screen will typically be similar to those displayed on the DC plant view screen representation 800 of FIG. 8. The I/O configuration screen representation 1100 in some implementations also includes: an "Add AC" button representation 1148; an "Add DC" button representation 1150; an "Add Fuel" button representation 1152; a "Delete AC" button representation 1154; and, a "Delete DC" button representation 1156. One skilled in the art should recognize that each of these button representations is self-explanatory. The user can further select to save the I/O configuration using the "Save" button representation 1158, or cancel the changes using the "Cancel" button representation 1160. Upon completing any changes, additions, deletions, etc. the user would select the "Close" button representation 1162 to instruct the client to close the "I/O Configuration" screen representation 1100. Referring now to FIG. 12, shown is a sample screen shot of an embodiment, among others, of an "I/O Configuration" screen representation 1200 for a DC plant (as selected by checkbox representation 1246). The "I/O Configuration" screen representation 1200 typically includes a number of row representations. Each of the row representations 1202–1230 typically refers to a variable monitored by the generator testing and monitoring application 350. Each of the column representations 1232–1244 (after the variable) represent different characteristics of the variable monitored. The "Channel" column representation 1232 typically represents the channel assigned to that variable to communicate with the remote device. The "Min Value," and "Max Value" column representations 1234, 1236, respectively, represent the limits of the gauges, as set by the user, while the "Min Alarm," and "Max Alarm" column representations 1238, 1240, respectively, represent the limits within which the signal stays without triggering an alarm. The "Visible" checkbox representation 1242 enables the user to make the variable visible or not visible to the user. The "Chan N/C" column representation 1244 typically represents the normal status of a monitored binary point, either a normally closed (N/C) condition or a normally open (N/O) condition.

The user can switch to a similar AC plant I/O configuration screen representation (described above with reference to FIG. 11) upon selecting the "AC signals" checkbox representation 1246. The AC signals at the AC plant I/O configuration screen will typically be similar to those displayed on the AC plant view screen representation 700 of FIG. 7. Similarly to FIG. 11, the I/O configuration screen representation 1200 can also include: an "Add AC" button representation 1248; an "Add DC" button representation 1250; an "Add Fuel" button representation 1252; a "Delete AC" button representation 1254; and, a "Delete DC" button representation 1256. The user can further select to save the I/O configuration using the "Save" button representation 1258, or cancel the changes using the "Cancel" button representation 1260. Upon completing any changes, additions, deletions, etc. the user would select the "Close" button representation 1262 to instruct the client to close the "I/O Configuration" screen representation 1200.

As mentioned above, the generator testing and monitoring application 350 in some implementations, is a web-based server, for example, among others. The web-based server would typically add new databases and new tables to the configuration of a client-server based application. In an embodiment, among others, of the generator testing and monitoring application 350 a web-based application would include a new web application database. The new web application database typically includes a web server table. Entries into the web server table includes, in some implementations, among others: a "ServerName" variable; a "MapName" variable; a "MapIdAc" variable; a "MapIdDc" variable; and a "DatabaseName" variable. The "ServerName" variable would typically include the names of servers that would appear in the selected area drop-down menu representation. The "MapName" variable would typically include the names of each of the maps available to the user and a path to access the map. The "MapIdAc" variable could typically include an identification of all AC generator maps. Similarly, the "MapIdDc" variable could typically include an identification of a DC plant maps. The "DatabaseName" variable would typically include the name of the database.

In an existing "EngineHub" database, the database would typically retain any existing tables such as an "OfficeConfigData" table. The "OfficeConfigData" table entries could typically include, among others: "WebMapLocationX," "WebMapLocationY," and "WebMapCrosshairType." These variables typically track the location of the currently selected office and what kind of "crosshairs" are used to highlight it on the map (based on status, for example, among others). The "EngineHub" database typically includes two new tables such as, for example, among others: a "WebDataLogAc" table; and, a "WebDataLogDc" table. The "WebDataLogAc" table typically includes information about the AC plants being tracked, such as the information shown above with respect to FIGS. 10 and 11. The "WebDataLogDc" table typically includes information about the DC plants being tracked, such as the information shown above with respect to FIGS. 10 and 12.

The application 350 would typically also retain a "TechNames" database, along with a "NetworkNames" table. The "NetworkNames" table typically includes a plurality of passwords related to the equipment (as shown in FIG. 10).

The web-based application 350 includes the following pages, among others: a "Login" page representation; a "General Menu" page representation; a "Changes Saved" page representation; a "User Account" page representation; a "Map View" page representation; an "Office View" page representation; a "Verification" page representation; a "Select Report Dates" page representation; a "Report" page representation; an "Office Configure" page representation; an "Office Configure—I/O" page representation; an "Office Configure—Map" page representation; and, a "Tech Name" page representation.

The "Login" page representation typically provides a user with a starting point to the system. The application 350 typically sends the login page representation to the user. Upon entering a user identification and password, the user would select a "Login" button representation. The application 350 typically receives the login button command, along with the user identification and password. The application 350 then checks the user identification and password against the "TechNames" database and "Password" entry. If the user identification and password is found in the database, then the application 350 sends the "General Menu" page representation to the user.

The "General Menu" page representation is substantially similar to the "Main" screen representation 400 of FIG. 4. Upon receiving a proper user identification and password, the application 350 will typically send the user a "General Menu" page representation. At the "General Menu" page representation, the user is able to select any of a plurality of button/pull-down representations. However, the application 350, will update the server list automatically at a predefined refresh rate. The application 350 typically retrieves this information from the "WebServers" table described above. The application 350 then loops through the list of servers and re-populate a "servers drop-down list" associated with the application. The application 350 also typically automatically updates the central office list associated with each of the COWAN servers. The application does this by connecting to the "EngineHub" database via the "OfficeConfigData" table. Again the application 350 would typically loop through the office list and re-populate an "office drop-down list" associated with the application. Upon the user selecting a new server, the application 350 would typically redirect the map view to a map associated with the new server. Upon sensing that the user has selected the "View" button representation, the application 350 redirects the user to a view of the selected office. Upon sensing that the user has selected the "Config" button representation, the application 350 redirects the user the "Office Configuration" page representation for a selected office. Upon sensing that the user has selected a "Report" button representation, the application 350 redirects the user to a "Report Dates" page representation. Upon sensing that the user has selected the "ASCII Mode" button representation, the application redirects the user to an "ASCII Mode" page representation. Upon sensing that the user has selected a "Users" button representation, the application 350 redirects the user to the "User Account" page representation.

The "Changes Saved" page representation typically enables the application 350 to make the requested changes to a database and return a confirmation to the user. The user would typically be redirected according to a link passed through with a "Save" request.

The "User Account" page representation is typically sent to the user from the application 350 when the user selects a "Users" button representation from the "General Menu" page representation. The "User Account" page representation typically enables the user to view and/or change a number of setting associated with the user's account. The application 350 typically retrieves the user's account information from the TechNames database, and populates the page representation with the information retrieved from the database about the current user. The application 350 typically enables the user to update information by overwriting any of the displayed field representations, and then selecting an "Update" button representation. Upon receiving an update request, the application 350 typically connects to the "TechNames" database and sends the updated information to the database entry associated with the user. The application 350 also enables the user to discard any changes made to the fields displayed by selecting a "Cancel" button representation.

The "Map View" page representation typically enables a user to view a map associated with a selected area. More particularly, in some embodiments, among others, the "Map View" page representation is a frame inside the "General Menu" page representation. The application 350 typically sends the "Map View" page representation to the user upon request. The application 350 then connects to the "EngineHub" database, and opens the "OfficeConfigData" table. The application then retrieves the "WebMapLocationX" and "WebMapLocationY" variables from the database responsive to the office selected, and inserts crosshairs onto the location of the selected central office.

The "Office View" page representation is substantially similar to the view screen representations of FIGS. 6–8. Responsive to whether an AC or DC selection is made, the application connects to the "EngineHub" database, opens the "WebDataLogAc" or "WebDataLogDc" entries, and reads each of the entries in that table. The application 350 typically enables (or disables) all of the button representations similarly to the button representations of FIG. 6–8. The application 350 also typically updates the central office information based upon updates from the server. The application 350 also provides an AC or DC view button representation operable to instruct the application 350 to toggle between the AC and DC views.

The "Verification" page representation verifies whether a user wishes to perform a particular action. The use of the verification page representation is typically limited to those instances in which the user has requested that the application begin or stop the generator or change information stored at the database. Each of these operations, in some embodiments, among others, present a verification page such that the user does not mistakenly perform an action.

The "Select Report Dates" page representation typically enables the user to specify dates for which he or she would like to see a report regarding central office generator(s)/plant(s). The application 350 typically sends the "Select Report Dates" page representation to the user. The user then typically enters a begin date and an end date, and select a "Submit" button representation. Upon receiving the "Submit" button representation selection, the application 350 loads a "Report" page representation. The "Report" page representation typically includes a report regarding the dates selected by the user. The application 350 performs this action by reading a "DataLog" table and populates a grid using information retrieved from the "CentralOfficeConfig" table. The "Select Report Dates" page representation also includes a hyperlink back to a "Map View" page representation and a "Re-select Dates" hyperlink back to the "Select Report Dates" page.

The "Office Configure" page representation is substantially similar to the screen representation of FIG. 10. Typically the application 350 opens the "OfficeDataConfig" table and populates the page using the data retrieved for the selected central office location. The application 350 also typically provides an "Accept" button which is operable to instruct the application to save the changes made, and an "Office" drop-down list that is operable to change the central office being viewed by the user. As mentioned before, the office configuration page representations in one embodiment, among others, is protected such that only administrators could access these pages.

The "Office Configure—I/O" page representation is substantially similar to the screen representation of FIGS. 12 and 13 (depending on the AC/DC selection). The application 350 typically reads the "OfficeDataConfig" table to populate the "Office Configure—I/O" page representation. The "Add AC," "Add DC," "Delete AC," "Delete DC" button representations are typically enables disabled according to the presence of AC and DC plants at the currently selected IP address. Upon selection of any of these button representations, the application 350 typically performs the action selected at the database. Moreover, the application 350 also provides a "View AC" and "View DC" button representation to toggle between the AC and DC I/O configurations.

The "Office Configure—Map" page representation allows the user to configure map data related to a central office. The application 350 typically retrieves the coordinates for the selected office from the "OfficeConfigData" table. The application 350 would then retrieve a map for the selected office an place crosshairs on the map according to the retrieved coordinates. The application 350 also enables the user to move the central office on the map using arrow button representations, or place the central office directly at specified coordinates. An "Accept" button representation would typically instruct the application 350 to save the new coordinates to the "OfficeDataConfig" table, while the "Cancel" button representation would typically cancel any changes made by the user.

The "Tech Name" page representation allows administrators to change information related to users who are authorized to use the system. The application 350 would typically retrieve the data related to users from the "TechNames" database and populate a grid using the data retrieved. The administrator then chooses to "Add," "Edit," or "Delete" a user in the "TechNames" database.

One skilled in the art should understand that page representations may be added or removed from the present disclosure without affecting the flow of the present disclosure. Therefore, it should be noted, that each of these alternative embodiments is intended to be within the scope of the present disclosure.

Process and function descriptions and blocks in flow charts can be understood as representing, in some embodiments, modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure. In addition, such functional elements can be implemented as logic embodied in hardware, software, firmware, or a combination thereof, among others. In some embodiments involving software implementations, such software comprises an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a computer-readable medium can be any means that can contain, store, communicate, propagate, or transport the software for use by or in connection with the instruction execution system, apparatus, or device.

It should also be emphasized that the above-described embodiments of the present disclosure are merely possible examples of implementations set forth for a clear understanding of the principles of the disclosure. Many variations and modifications may be made to the above-described embodiment(s) of the disclosure without departing substantially from the principles of the disclosure. All such modifications and variations are intended to be included herein within the scope of this disclosure and the present disclosure and protected by the following claims.

What is claimed is:

1. A remote generator fuel monitoring system, comprising:
graphical user interface logic operable to provide a user with a plurality of periodically updated data points associated with a fuel monitor coupled to an AC plant, wherein the graphical user interface logic is operable to generate a request for simulation of a commercial power failure at a site associated with the AC plant; and
connection logic coupled to the graphical user interface logic, operable to connect to a monitoring server and receive the plurality of periodically updated data points associated with the fuel monitor, the monitoring server being coupled to a plurality of fuel monitors via a network.

2. The system of claim 1, further comprising:
a data gathering unit operable to receive a fuel level signal from the fuel monitor.

3. The system of claim 2, wherein the server is operable to query the data gathering unit, and provide the connection logic with the fuel monitor signal.

4. The system of claim 1, wherein the graphical user interface is further operable to provide a user with a plurality of periodically updated data points associated with an AC plant.

5. The system of claim 4, further comprising:
testing logic operable to receive feedback from the user and simulate a commercial power failure at a site associated with the AC plant.

6. The system of claim 5, further comprising:
a house service panel coupled to a commercial power source, the AC plant, and a DC plant, the house service panel being operable to sense a commercial power failure, turn on the AC plant, and power at least one rectifier associated with the DC plant using an output from the AC plant.

7. The system of claim 1, wherein the graphical user interface is further operable to provide a user with a plurality of periodically updated data points associated with a DC plant.

8. The system of claim 1, further comprising:
storage logic operable to store a plurality of acceptable data points associated with the fuel monitor, and report the acceptable data points to the user via the graphical user interface; and
alarm logic operable to notify a user via the graphical user interface logic responsive to the plurality of periodically updated data points associated with the fuel monitor being outside the plurality of acceptable data points.

9. The system of claim 8, wherein the alarm logic is operable to signal a minor alarm responsive to a portion of the periodically updated information being outside an initial acceptable data point, and operable to signal a major alarm responsive to a portion of the periodically updated information being outside a final acceptable data point.

10. A remote generator fuel monitoring system, comprising:
monitoring logic operable monitor at least one fuel monitor associated with at least one AC plant and receive a plurality of data signals associated with said at least one fuel monitor;
storage logic operable to store at least one boundary parameter associated with said at least one fuel monitor;
communication logic operable to receive the plurality of data signals and said at least one boundary parameter and provide the plurality of data signals and said at least one boundary parameter to a remote computer; and
testing logic operable to simulate a commercial power failure at a site associated with the at least one AC plant.

11. The system of claim 10, wherein the monitoring logic is further operable to monitor at least one AC plant, and receive a plurality of data signals associated with said at least on AC plant.

12. The system of claim 11, wherein the storage logic is further operable to store at least one boundary parameter associated with said at least one AC plant.

13. The system of claim 12, further comprising:
alarm logic operable to notify at least one remote computer associated with the system responsive to any of the plurality of data signals associated with said at least one AC plant being outside said at least one boundary parameter associated with said at least one AC plant.

14. The system of claim 10, further comprising:
alarm logic operable to notify at least one remote computer associated with the system responsive to any of the plurality of data signals associated with said at least one fuel monitor being outside said at least one boundary parameter associated with said at least one fuel monitor.

15. The system of claim 10, wherein the communication logic is operable to periodically request a plurality of updated data signals from the fuel monitor.

16. The system of claim 10, wherein the monitoring logic is further operable to monitor at least one DC plant, and receive a plurality of data signals associated with said at least one DC plant.

17. The system of claim 16, wherein the storage logic is further operable to store at least one boundary parameter associated with said at least one DC plant.

18. The system of claim 17, further comprising:
alarm logic operable to notify at least one remote computer associated with the system responsive to any of the plurality of data signals associated with said at least one DC plant being outside said at least one boundary parameter associated with said at least one DC plant.

19. A method for remotely monitoring a fuel monitor, comprising the steps of:
generating a command for simulating a commercial power failure at a site associated with an AC plant;
requesting a plurality of data signals associated with the fuel monitor coupled to the AC plant;
receiving the plurality of data signals associated with the fuel monitor; and
providing the plurality of data signals associated with the fuel monitor to a remote computer for display to a user.

20. The method of claim 19, further comprising:
comparing each of the plurality of data signals associated with the fuel monitor to a corresponding plurality of boundary parameters associated with the fuel monitor; and
notifying the remote computer responsive to any of the plurality of data signals associated with the fuel monitor being outside the corresponding boundary parameter.

21. The method of claim 19, further comprising:
requesting a plurality of data signals associated with the AC plant;
receiving the plurality of data signals associated with the AC plant; and
providing the plurality of data signals associated with the AC plant to a remote computer for display to a user.

22. The method of claim 21, further comprising:
comparing each of the plurality of data signals associated with the AC plant to a corresponding plurality of boundary parameters associated with the AC plant; and
notifying the remote computer responsive to any of the plurality of data signals associated with the AC plant being outside the corresponding boundary parameter.

23. The method of claim 19, further comprising:
requesting a plurality of data signals associated with an DC plant;
receiving the plurality of data signals associated with the DC plant; and
providing the plurality of data signals associated with the DC plant to a remote computer for display to a user.

24. The method of claim 23, further comprising:
comparing each of the plurality of data signals associated with the DC plant to a corresponding plurality of boundary parameters associated with the DC plant; and
notifying the remote computer responsive to any of the plurality of data signals associated with the DC plant being outside the corresponding boundary parameter.

25. The method of claim 19, further comprising:
displaying the plurality of data signals associated with the fuel monitor on the remote computer.

26. The method of claim 19, further comprising:
updating the plurality of data signals associated with the fuel monitor.

27. A computer readable medium having a program for remotely monitoring a fuel monitor, the program comprising the steps of:
generating a command for simulating a commercial power failure at a site associated with an AC plant;
requesting a plurality of data signals associated with the fuel monitor coupled to the AC plant;
receiving the plurality of data signals associated with the fuel monitor; and
providing the plurality of data signals associated with the fuel monitor to a remote computer for display to a user.

28. The program of claim 27, further comprising:
comparing each of the plurality of data signals associated with the fuel monitor to a corresponding plurality of boundary parameters associated with the fuel monitor; and
notifying the remote computer responsive to any of the plurality of data signals associated with the fuel monitor being outside the corresponding boundary parameter.

29. The program of claim 27, further comprising:
requesting a plurality of data signals associated with the AC plant;
receiving the plurality of data signals associated with the AC plant; and
providing the plurality of data signals associated with the AC plant to a remote computer for display to a user.

30. The program of claim 29, further comprising:
comparing each of the plurality of data signals associated with the AC plant to a corresponding plurality of boundary parameters associated with the AC plant; and
notifying the remote computer responsive to any of the plurality of data signals associated with the AC plant being outside the corresponding boundary parameter.

31. The program of claim 27, further comprising:
requesting a plurality of data signals associated with an DC plant;
receiving the plurality of data signals associated with the DC plant; and
providing the plurality of data signals associated with the DC plant to a remote computer for display to a user.

32. The program of claim 31, further comprising:
comparing each of the plurality of data signals associated with the DC plant to a corresponding plurality of boundary parameters associated with the DC plant; and
notifying the remote computer responsive to any of the plurality of data signals associated with the DC plant being outside the corresponding boundary parameter.

33. The program of claim 27, further comprising:
displaying the plurality of data signals associated with the fuel monitor on the remote computer.

34. The program of claim 27, further comprising: updating the plurality of data signals associated with the fuel monitor.

* * * * *